(12) United States Patent
Kobo et al.

(10) Patent No.: US 12,592,923 B2
(45) Date of Patent: Mar. 31, 2026

(54) AUTHENTICATION AND ENFORCEMENT OF DIFFERENTIATED POLICIES FOR A BRIDGE MODE VIRTUAL MACHINE BEHIND A WIRELESS HOST IN A MAC BASED AUTHENTICATION NETWORK

(71) Applicant: Cisco Technology, Inc., San Jose, CA (US)

(72) Inventors: Roberto Mitsuo Kobo, Pleasanton, CA (US); Zheng Li, Santa Clara, CA (US); Gopala Krishna Andagunda, Karnataka (IN); Einar Nilsen-Nygaard, East Ayr (GB); Shree Murthy, San Jose, CA (US); Parthiv Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 106 days.

(21) Appl. No.: 18/746,555

(22) Filed: Jun. 18, 2024

(65) Prior Publication Data

US 2024/0340283 A1     Oct. 10, 2024

Related U.S. Application Data

(63) Continuation of application No. 17/743,758, filed on May 13, 2022, now Pat. No. 12,069,051.

(51) Int. Cl.
H04L 29/06 (2006.01)
G06F 9/455 (2018.01)
(Continued)

(52) U.S. Cl.
CPC ...... H04L 63/0876 (2013.01); G06F 9/45558 (2013.01); H04L 61/5014 (2022.05);
(Continued)

(58) Field of Classification Search
CPC ............. H04L 63/0876; H04L 61/5014; H04L 63/101; H04L 63/20; H04L 63/0236;
(Continued)

(56) References Cited

U.S. PATENT DOCUMENTS

| 10,574,701 B1* | 2/2020 | Averi ................... G06F 9/45558 |
| 2008/0008141 A1* | 1/2008 | Tchigevsky ............. H04W 8/18 |
| | | 370/338 |

(Continued)

FOREIGN PATENT DOCUMENTS

| CN | 102238527 A | 11/2011 |
| CN | 103647780 A | 3/2014 |

(Continued)

OTHER PUBLICATIONS

Cisco Wireless LAN Controller Configuration Guide, Release 7.4 Configuration IP-MAC Address, https://www.cisco.com/c/en/us/td/docs/wireless controller/7-4/configuration/guides/consolidated/b_cg74_CONSOLIDATED/m_configuring_ip-mac_address-binding.html, p. 28, Jun. 28, 2021, 1-30 pgs.

(Continued)

*Primary Examiner* — Ka Shan Choy
(74) *Attorney, Agent, or Firm* — Lee & Hayes, P.C.

(57) ABSTRACT

Techniques for authenticating and enforcing differentiated policies for a virtual machine (VM) executing in bridge mode on a host device are described. In an example method a fabric edge device determines a MAC address of the VM executing on the host device. The fabric edge device transmits an access request to create a session for the VM to an authentication server. The fabric edge device receives an indication that the VM is authenticated and a session for the VM has been created from the authentication server. The authentication server determines a policy to apply to packets communicated from the VM and assigns an IP address to the (Continued)

VM to create a MAC-IP binding for the VM. The fabric edge device applies the policy for the VM to packets with a source IP address corresponding to an IP address assigned to the VM.

20 Claims, 7 Drawing Sheets

(51) Int. Cl.
  *H04L 9/40* (2022.01)
  *H04L 61/5014* (2022.01)

(52) U.S. Cl.
  CPC ............. *H04L 63/101* (2013.01); *H04L 63/20* (2013.01); *G06F 2009/45587* (2013.01); *G06F 2009/45595* (2013.01)

(58) Field of Classification Search
  CPC ............... H04L 61/103; G06F 9/45558; G06F 2009/45587; G06F 2009/45595
  See application file for complete search history.

(56) References Cited

U.S. PATENT DOCUMENTS

| | | | |
|---|---|---|---|
| 2013/0152075 A1 | 6/2013 | Cardona et al. | |
| 2013/0332982 A1 | 12/2013 | Rao et al. | |
| 2015/0040183 A1 | 2/2015 | Sharp et al. | |
| 2016/0350148 A1 * | 12/2016 | Kitagawa | G06F 9/5027 |
| 2017/0195306 A1 | 7/2017 | Ishaya et al. | |
| 2021/0014279 A1 * | 1/2021 | Hoole | H04L 63/20 |
| 2021/0226937 A1 | 7/2021 | Mathaiyan et al. | |
| 2023/0131771 A1 | 4/2023 | Murthy et al. | |
| 2023/0370453 A1 | 11/2023 | Kobo et al. | |

FOREIGN PATENT DOCUMENTS

| | | | | |
|---|---|---|---|---|
| CN | 102238527 B | * | 7/2014 | |
| CN | 105162897 A | * | 12/2015 | ......... H04L 41/0803 |

OTHER PUBLICATIONS

PCT Search Report and Written Opinion mailed Jun. 30, 2023 for PCT application No. PCT/US23/21994, 49 pgs.

* cited by examiner

200

400 —

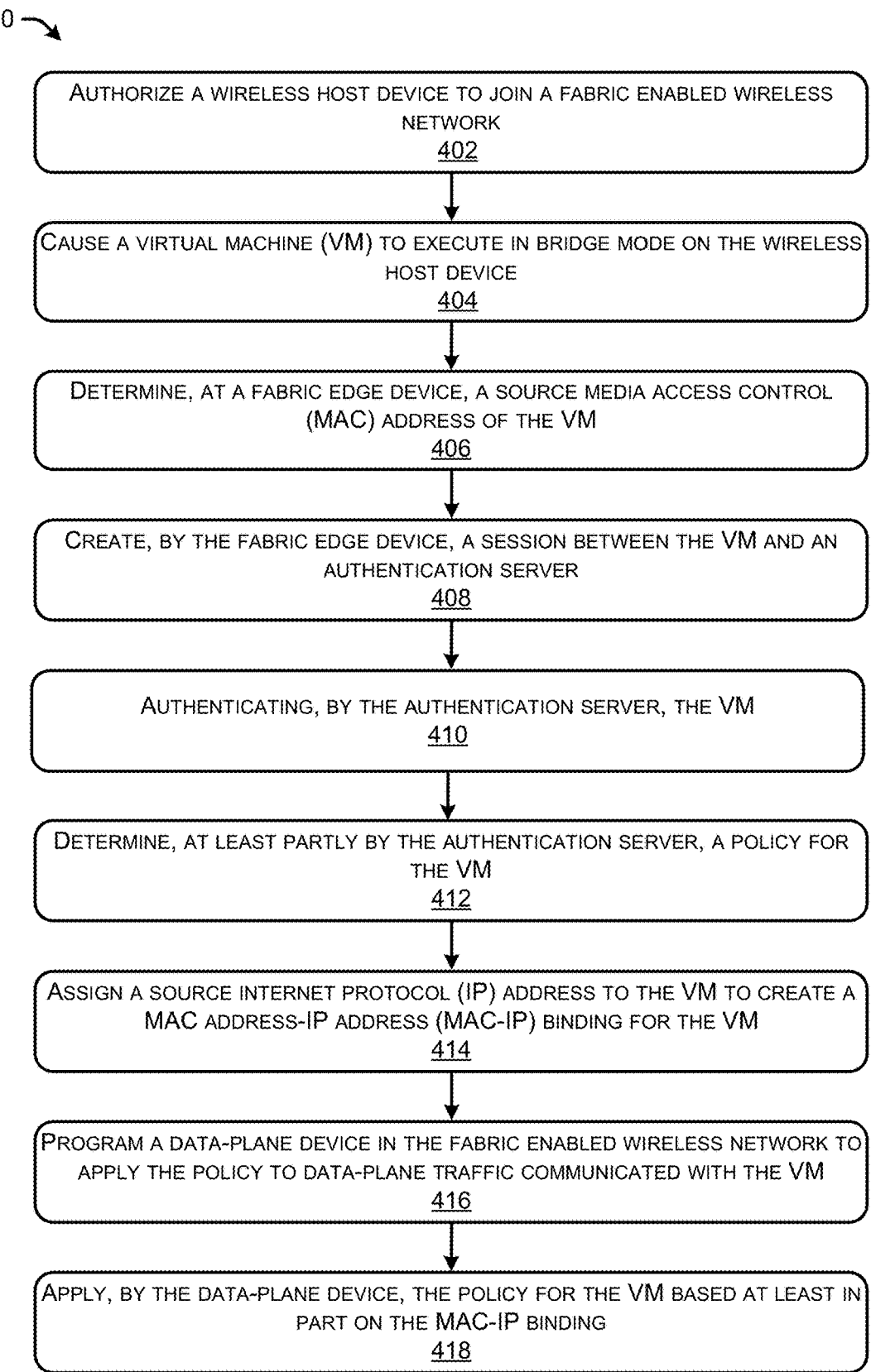

AUTHORIZE A WIRELESS HOST DEVICE TO JOIN A FABRIC ENABLED WIRELESS
NETWORK
402

CAUSE A VIRTUAL MACHINE (VM) TO EXECUTE IN BRIDGE MODE ON THE WIRELESS
HOST DEVICE
404

DETERMINE, AT A FABRIC EDGE DEVICE, A SOURCE MEDIA ACCESS CONTROL
(MAC) ADDRESS OF THE VM
406

CREATE, BY THE FABRIC EDGE DEVICE, A SESSION BETWEEN THE VM AND AN
AUTHENTICATION SERVER
408

AUTHENTICATING, BY THE AUTHENTICATION SERVER, THE VM
410

DETERMINE, AT LEAST PARTLY BY THE AUTHENTICATION SERVER, A POLICY FOR
THE VM
412

ASSIGN A SOURCE INTERNET PROTOCOL (IP) ADDRESS TO THE VM TO CREATE A
MAC ADDRESS-IP ADDRESS (MAC-IP) BINDING FOR THE VM
414

PROGRAM A DATA-PLANE DEVICE IN THE FABRIC ENABLED WIRELESS NETWORK TO
APPLY THE POLICY TO DATA-PLANE TRAFFIC COMMUNICATED WITH THE VM
416

APPLY, BY THE DATA-PLANE DEVICE, THE POLICY FOR THE VM BASED AT LEAST IN
PART ON THE MAC-IP BINDING
418

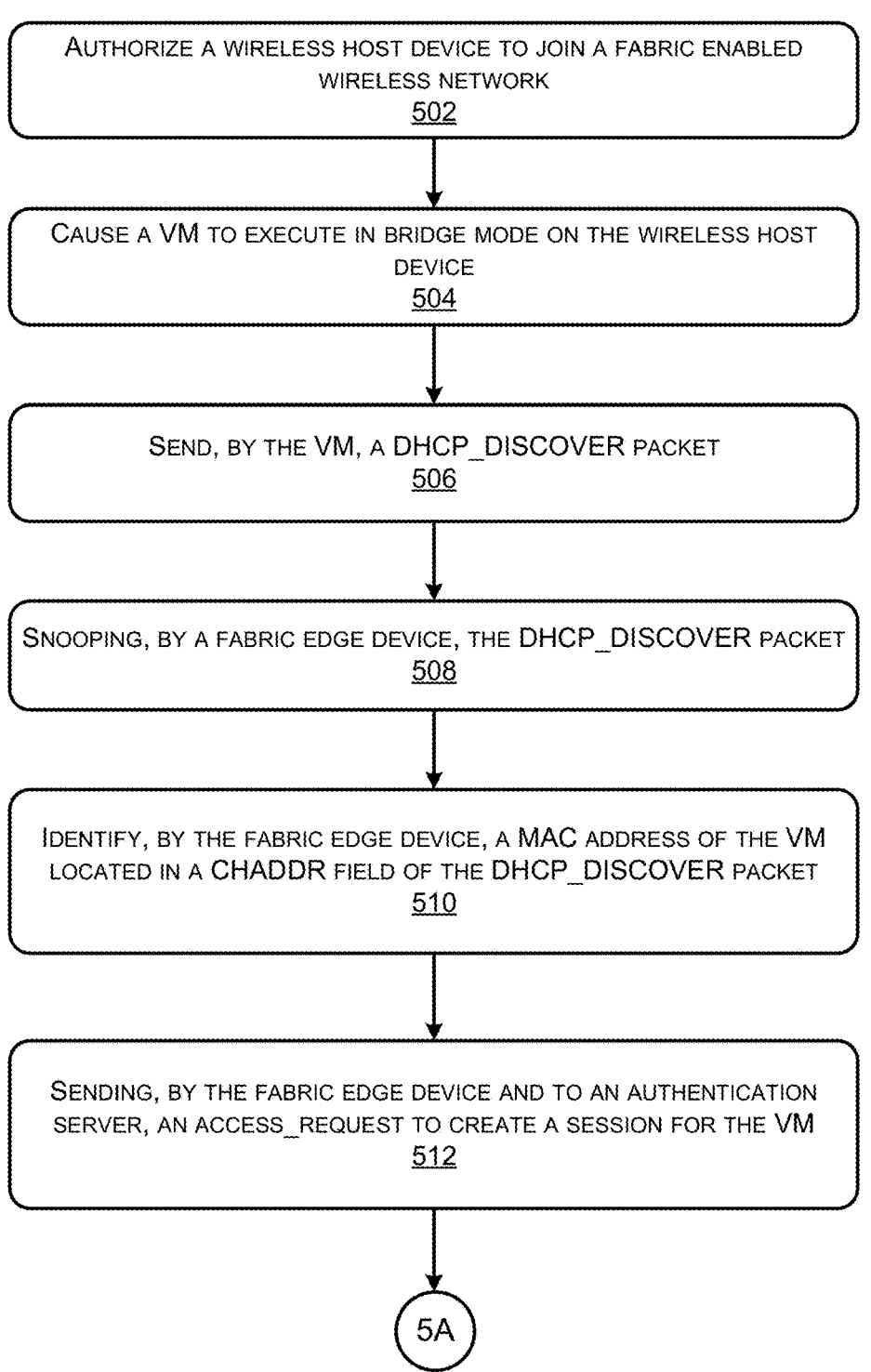

AUTHORIZE A WIRELESS HOST DEVICE TO JOIN A FABRIC ENABLED WIRELESS NETWORK
502

CAUSE A VM TO EXECUTE IN BRIDGE MODE ON THE WIRELESS HOST DEVICE
504

SEND, BY THE VM, A DHCP_DISCOVER PACKET
506

SNOOPING, BY A FABRIC EDGE DEVICE, THE DHCP_DISCOVER PACKET
508

IDENTIFY, BY THE FABRIC EDGE DEVICE, A MAC ADDRESS OF THE VM LOCATED IN A CHADDR FIELD OF THE DHCP_DISCOVER PACKET
510

SENDING, BY THE FABRIC EDGE DEVICE AND TO AN AUTHENTICATION SERVER, AN ACCESS_REQUEST TO CREATE A SESSION FOR THE VM
512

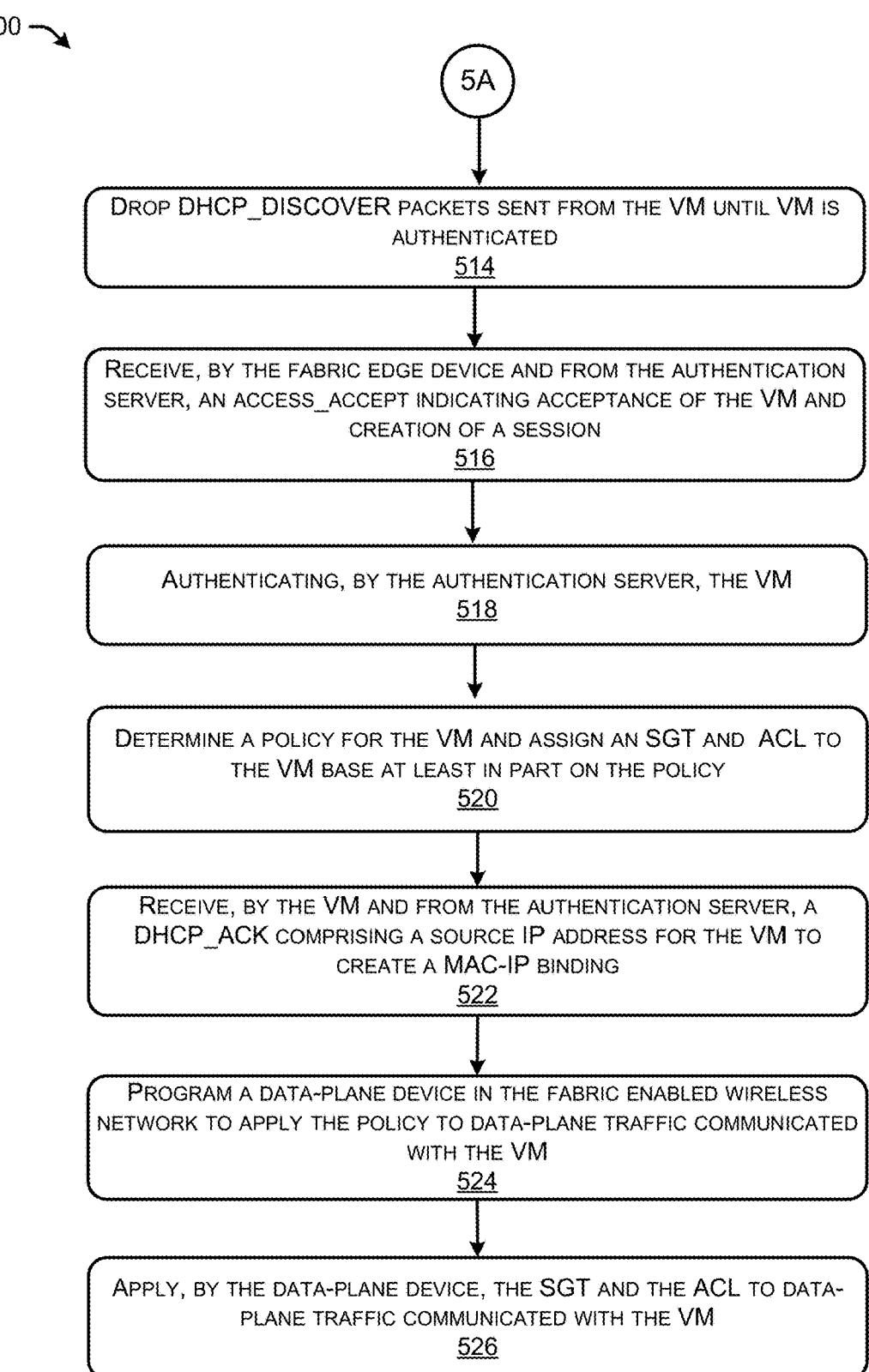

5A

DROP DHCP_DISCOVER PACKETS SENT FROM THE VM UNTIL VM IS AUTHENTICATED
514

RECEIVE, BY THE FABRIC EDGE DEVICE AND FROM THE AUTHENTICATION SERVER, AN ACCESS_ACCEPT INDICATING ACCEPTANCE OF THE VM AND CREATION OF A SESSION
516

AUTHENTICATING, BY THE AUTHENTICATION SERVER, THE VM
518

DETERMINE A POLICY FOR THE VM AND ASSIGN AN SGT AND ACL TO THE VM BASE AT LEAST IN PART ON THE POLICY
520

RECEIVE, BY THE VM AND FROM THE AUTHENTICATION SERVER, A DHCP_ACK COMPRISING A SOURCE IP ADDRESS FOR THE VM TO CREATE A MAC-IP BINDING
522

PROGRAM A DATA-PLANE DEVICE IN THE FABRIC ENABLED WIRELESS NETWORK TO APPLY THE POLICY TO DATA-PLANE TRAFFIC COMMUNICATED WITH THE VM
524

APPLY, BY THE DATA-PLANE DEVICE, THE SGT AND THE ACL TO DATA-PLANE TRAFFIC COMMUNICATED WITH THE VM
526

FIG. 5B

LOCAL AREA
NETWORK
624

NETWORK
INTERFACE
CONTROLLER
612

INPUT/OUTPUT
CONTROLLER
616

CHIPSET 606

CPU(S)
604

RAM
608

ROM
610

STORAGE
CONTROLLER
614

COMPUTER-READABLE MEDIA
618

OPERATING SYSTEM
620

PROGRAMS
622

BASEBOARD (MOTHERBOARD)
602

COMPUTER
600

AUTHENTICATION AND ENFORCEMENT OF DIFFERENTIATED POLICIES FOR A BRIDGE MODE VIRTUAL MACHINE BEHIND A WIRELESS HOST IN A MAC BASED AUTHENTICATION NETWORK

RELATED APPLICATIONS

This application claims priority to U.S. patent application Ser. No. 17/743,758, filed on May 13, 2022; the entire contents of which are incorporated herein by reference.

TECHNICAL FIELD

The present disclosure relates generally to the authentication and enforcement of differentiated policies for entities located behind a wireless endpoint in a media access control (MAC)-based authentication network.

BACKGROUND

Zero trust deployment is ever increasing in necessity in enterprise network deployments. Zero trust is a network security model based on a strict identity verification process, where only authenticated or authorized users and devices have access to certain data or applications. The reliance on zero trust deployments necessitates that clients in a network be identified whether they are wired or wireless, physical or virtual. As part of this model, it is necessary to have visibility of each client, even when a virtual machine (VM) is hosted on a wireless client in bridge mode. Bridge mode refers to a configuration in which at least one VM communicates with external systems or services directly (e.g., using the wireless client's network interface). The wireless client's network interface acts as a "bridge" between the VM and the network allowing the VM access to the network and other devices connected to the network. When in bridge mode, the VM communicates with external services directly, using the host's network interface. A fabric edge device will see the VM in bridge mode as a separate device, apart from the host device, having its own IP address. In contrast, if a VM is not in bridge mode, the VM may not be directly visible to the network in the same way the host is. Essentially, the VM may be hidden from the network, behind the host, when a VM is not bridged to the network by the hosts network interface.

When a VM in bridge mode is hosted on a wireless client device, a single media access control (MAC) address is associated with the wireless interface. Thus, packets sent by any client attached to the wireless interface, either the host device or the VM, are sent using the wireless interface MAC address. Similarly, packets sent to either the wireless host device or the VM are sent to the MAC address of the wireless interface. Because the traffic generated by the wireless client (and the traffic generated by the VMs hosted by the wireless client) use the same wireless adapter MAC address as the source MAC address for all traffic originated by the wireless client and VMs hosted by the wireless client, the wireless infrastructure is only aware of the wireless client. For a MAC-based authentication network, this results in all authentication and authorization policies being applied to the wireless adapter MAC address. Thus, devices using the wireless infrastructure will not observe the MAC address associated with individual VMs in, for example, Institute of Electrical and Electronics Engineers (IEEE) 802.11 packets that are being sent via the wireless interface.

Problems may occur with the above environment when specific policies, such as security policies, are to be enforced for individual VMs. For example, the environment described above may not support the enforcement of policies on individual VMs in a MAC-based authentication network because the VM MAC address is not observed by the network infrastructure. Thus, there is a need for a zero trust deployment of a VM in bridge mode hosted on a wireless client device in a MAC-based authentication network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example method for enforcing policies for a VM executing in bridge mode on a wireless host device.

FIGS. 5A and 5B collectively illustrate a flow diagram of an example method for authenticating and applying a policy to a VM assigned a source IP address using DHCP and executing in bridge mode on a wireless host device.

DESCRIPTION OF EXAMPLE EMBODIMENTS

Overview

Figure 1:
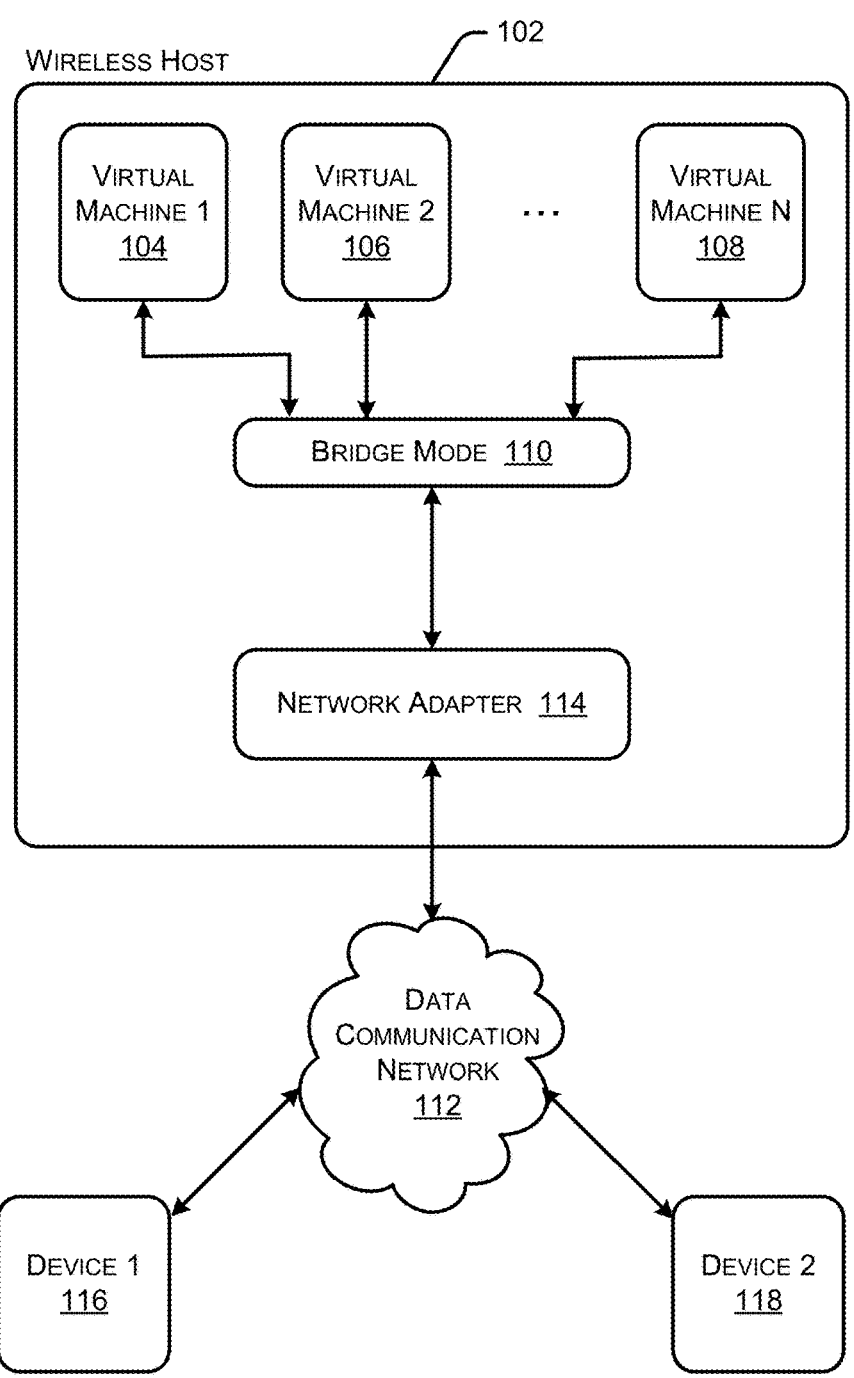
FIG. 1 illustrates a system-architecture diagram of an example network containing multiple devices, a wireless host device, and a wireless network adapter.

This disclosure describes the authentication and the enforcement of differentiated policies for a virtual machine (VM) executing in bridge mode on a wireless host device in a media access control (MAC)-based authentication network. In some embodiments, one or more methods may be implemented at least partially by a system of devices and or components associated with a network fabric. In some instances, a method may include authorizing a wireless host device to join a fabric enabled wireless network, and causing a VM to execute in bridge mode on the wireless host device. Further, the method may include determining, at a fabric edge device, a source MAC address of the VM. The method may further include creating, by the fabric edge device, a session between the VM and an authentication server, and authenticating, by the authentication server, the VM. The method may further include, determining, at least partly by the authentication server, a policy for the VM. Further, the method may include assigning a source internet protocol (IP) address to the VM to create a MAC address-IP address (MAC-IP) binding for the VM. The method may further include programming a data-plane device in the fabric enabled wireless network to apply the policy to data-plane traffic communicated with the VM. Finally, the method may include applying, by the data-plane device, the policy for the VM based at least in part on the MAC-IP binding.

In some instances, the method may further include the VM being assigned the source IP address using dynamic host configuration protocol (DHCP).

In some examples, the method further includes the fabric edge device determining the source MAC address of the VM using deep packet inspection by snooping a DHCP_DIS-COVER packet sent by the VM to identify the source MAC address of the VM.

In some cases, the method may further include sending, by the fabric edge device and to the authentication server, an Access_Request message to create the session for the VM, dropping DHCP_DISCOVER packets sent from the VM until the VM is authenticated, and receiving, from the authentication server and by the fabric edge device, an Access_Accept message indicating acceptance of the VM and creation of the session.

In various examples, the method further includes assigning a security group tag (SGT) and an access control list (ACL) to the VM based at least in part on the policy.

In some examples, the method further includes binding the SGT assigned to the VM to the IP address of the VM.

In some implementations, the method further includes initiating a MAC authentication bypass (MAB) session for the VM.

In various cases, the method further includes the authentication server establishing the VM as a child session associated with a parent session ID, wherein the parent session ID is a MAC address of the wireless host device.

In some examples, the method further includes more than one VM being provisioned to execute on the wireless host device, and each VM having an individual policy applied.

The systems and methods described herein allow for the authentication and enforcement of differentiated policies for a VM executing in bridge mode on a wireless host device. Additionally, the described systems and methods may allow multiple VMs within the virtual host to have separate individual policies, each of which may be different from the virtual host's policy.

Additionally, the techniques described herein may be performed by a system and/or device having non-transitory computer-readable media storing computer-executable instructions that, when executed by one or more processors, performs the method described above.

Example Embodiments

As mentioned above, problems can occur when attempting to authenticate and to enforce differentiated policies for entities located behind a wireless endpoint (or any host device). For example, with a zero trust network security model, strict identity verification is necessary in order for a client device to access certain data and applications. Typically, for a wireless device to join a network, MAC authorization bypass (MAB) is used to authenticate the wireless device. When enabled on a switchport, MAB allows the switch to drop all frames except for the first frame to learn the MAC address, and connects to a RADIUS server to check if it permits the MAC address. This presents a problem for a VM in bridge mode executing on a wireless host, because the source MAC address for the VM may be overwritten with the host MAC address, thus there is no capability to authenticate the VM independently of the wireless host as the MAC address of the VM is not seen by a fabric edge device. Additionally, in various examples, differentiated policies are to be enforced on each of the individual VMs, and those policies may be different from policies that are applied to the wireless host device on which the VM(s) is executing. In these situations, existing systems and methods are not able to use a Remote Dial-In User Service (RADIUS) change of authorization policies because there is no session present in the RADIUS server for each of the individual VMs. A RADIUS server may be a distributed client/server system that secures networks against unauthorized access.

As an example, wireless host devices are able to host VMs in a bridge mode where the VM is connected to a network using the host device's network adapter (e.g., Ethernet adapter). With bridge networking, the virtual network adapter in a VM connects to a physical network adapter in the host device or system. The host network adapter enables the virtual machine to connect to the LAN that the host system uses. Bridge networking works with both wired and wireless host network adapters. Bridge networking configures the VM as a unique identity on the network, separate from and unrelated to the host system. The VM is a full participant in the network, the VM has access to other machines on the network, and other machines on the network can contact the VM as if it were a physical computer on the network.

However, in IEEE 802.11 environments, a single MAC address is associated with a wireless interface and as such, when a wireless host device has one or more VMs hosted that are in bridge mode, the host device behaves in such a way that all of the traffic generated by the host device and the traffic generated by the VMs executing on the host device use the same wireless adapter MAC address as the source MAC address in the traffic originated by the host/VMs. This means that the wireless infrastructure on the network is aware of only the host device and all the authentication and authorization policies are applied on the host MAC. The VM's MAC address is not observed in the IEEE 802.11 packets that are being sent on the air/wire to the wireless controller.

However, in zero trust deployments, it is necessary to have visibility of each client, including VMs, and to be able to enforce differentiated policies on each of these individual VMs. In such cases, it is not possible to use the usual RADIUS change of authorization policies as there is no session present in the RADIUS server for each of the individual VMs. This creates a problem on networks based on the client MAC for the authentication and subsequent policy enforcement. In a system where the entire infrastructure relies on the client MAC address, the bridge mode VM on a wireless host becomes an unsupported client or gains the property of the host itself. This makes it very difficult, or impossible, to apply differentiated policies for the individual VMs.

This disclosure describes techniques that enable the existing MAC-based security and identity infrastructure to be leveraged and used for a bridge mode VM behind a wireless host device. Generally, the VM(s) that are running on the wireless host device that are in bridge mode obtain their respective IP address through Dynamic Host Configuration Protocol (DHCP), although the methods described herein are not limited to DHCP and may use other mechanisms for obtaining an IP address.

Once the VM information has been determined, such as the IP and MAC information, this information can be used to program a data-plane device in the fabric enabled wireless network and used by a fabric edge device to enforce differentiated policies for bridge VMs. Thus, deep packet inspection by snooping DHCP_DISCOVER packets to determine VM context (e.g., source MAC address) is performed to identify and authenticate VMs running in bridge mode on a wireless host device. Once the source MAC for the VM is discovered, the MAB can be initiated and the VM can be authenticated as any other client in a MAC-based authentication network. In addition, techniques described herein augment the VM client information to indicate the VM session is a "child session" and also adds the "parent session ID" which is the host device's MAC address. This allows the authentication server to establish a "child" (VM) and "parent" (host) relationship between the VM and the wireless host device. To improve security, the fabric edge device, which is performing the discovery, checks if the parent session (i.e., host session) is a wireless MAC installed by a wireless controller (WLC) as part of a fabric enabled wireless solution, where the WLC already performed the authentication and authorization of the wireless host device.

The client session established for the VM is used between the security/identity server infrastructure to authenticate the VM and provide the policies to be used for the client (VM) in the same way as is done for any other client. Once the session is created, the server can send policy information and change of authorization for the fabric edge device to apply to the VM client.

Additionally, when applying a policy to a client, the client is classified via a source MAC lookup, which retrieves the policy to be applied to the client. However, as discussed above, for the bridge mode VM executing on a wireless host device, the VM source MAC is not visible, therefore the source MAC lookup cannot be used to retrieve the policy. Techniques described herein provide for the use of the source IP address for applying policy instead of the source MAC address. Thus, the policy assigned to the VM MAC address, which was discovered during the first packet on the DHCP procedure is translated and applied to the VM IP address which is the IP address used by the VM to which the policy was given. Accordingly, a key result for this authentication method is the application of differentiated policies to the VMs by means of different security group tags (SGT) and access control list (ACL) based enforcement to differentiate the VMs and the wireless host device. For example, the SGT tag may be used to control traffic based on the tag information. A fabric edge device may take a source SGT and look it up against a destination SGT to determine if the traffic should be allowed or denied. Although SGT is used herein to describe the methods used to implement the techniques for authentication and enforcement of differentiated policies for a bridge mode VM behind a wireless host in a MAC-based authentication network, the techniques are not limited to SGT and may alternately or in addition be any kind of relevant group-tag used to enforce a differentiated policy. Similarly, an ACL list is a list of rules that specifies which users or systems are granted or denied access to a particular system resource. For example, a security group access control list (SGACL) is a policy with which an administrator can control operations performed by the client based on a security group assignment for the client.

Although the systems and methods described herein are discussed with respect to one or more VMs executing in bridge mode on a wireless host device, these systems and methods may be used with any type of device or system. Further, although particular examples are discussed with reference to virtual machines, alternate embodiments may include other types of devices that are bridged or located on a host device, such as containers.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example network 100 containing multiple devices, a wireless host with a wireless network adapter, multiple VMs, and a data communication network. As shown in FIG. 1, network 100 includes a wireless host device 102. In some embodiments, wireless host device 102 may also be referred to as a "virtual host," "host system," or simply "host." The wireless host device 102 may comprise any type of device configured to communicate over one or more networks, such as network devices including a wireless endpoint, an access point, a router, a switch, a server, a load balancer, etc. The wireless host device 102 may be a personal computing device, such as a workstation, desktop computer, laptop, tablet, network appliance, e-reader, smartphone, or other computing device, and/or any other type of device.

The wireless host device 102 may implement (or execute) any number of VMs, such as VM 1 104, VM 2 106, up to VM N 108 (where "N" is any integer of 1 or greater). In the example of FIG. 1, VMs 104, 106, and 108 are in bridge mode 110. Generally, when in bridge mode 110, the VMs 104, 106, and 108 are connected to a data communication network 112 using the wireless host device's 102 network adapter 114 (e.g., Ethernet adapter). With bridged networking, the virtual network adapter in each VM 104, 106, and 108 connects to the physical network adapter 114 in the wireless host device 102. The host network adapter 114 enables the VMs 104, 106, and 108 to connect to the data communication network 112 that the wireless host device 102 uses. Generally, the network adapter may include functionality for providing network connectivity through a Network Interface Controller (NIC), such as a gigabit Ethernet adapter. The network adapter 114 is usable to connect the wireless host device 102 to other computing devices such as device 1 116 and device 2 118, etc., over the data communication network 112. The data communication network 112 may include one or more networks implemented by any viable communication technology. The data communication network 112 may include any one or more of IEEE 802.11 networks (e.g., WIFI networks), Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The data communication network 112 may include devices, virtual resources, or other nodes that relay packets from one network segment to another by nodes in the network.

Bridged networking configures each VM 104, 106, and 108 as a unique identity on the network, separate from and unrelated to the wireless host device 102. The VMs 104, 106, and 108 are full participants in the network 112 and they have access to other machines on the network, and other machines on the network 112 can contact them as if they were physical computers on the network 112. Two devices, device 1 116 and device 2 118 are shown as being coupled to data communication network 112. Devices 116 and 118 may be any type of computing device or other system capable of communicating with wireless adapter 114 via data communication network 112. Devices 116 and 118 may interact with network 112 via a wired communication link, wireless communication link, or a combination of wired and wireless communication links. Although two devices 116, 118 are shown in FIG. 1, particular implementations of network 100 may include any number of devices connected to one or more data communication networks, cellular networks, and other networks (not shown). Data communication network 112 can be any type of network that has any type of network topology and uses any type of communication protocol. Data communication network 112 may also represent a combination of two or more networks.

As described in more detail later in this disclosure, one or more devices (e.g., a system of devices) may enable the enforcement of differentiated policies for bridged VMs 104, 106, and 108 where the V N information (e.g., MAC address) is discovered through deep packet inspection. As described herein, the VM(s) 104, 106, and 108 that are running on the wireless host device 102 that are in bridge mode 110, obtain their respective IP address(es) through DHCP, although these techniques are not limited to DHCP, and any other appropriate method may be used. However, since all the traffic from the wireless host device 102 and VMs 104, 106, and 108 behind it use the same source MAC address, the infrastructure of the network 112 (e.g., access switch) only sees the wireless host device 102. Thus, deep packet inspection of the DHCP packets is used to discover the V M source MAC information.

The above-noted example is merely illustrative, and various changes may be made to achieve similar or the same results. For example, wireless host device 102 may include any number of VMs that can interact with any number of devices 116, 118 via data communication network 112 and/or other data communication mechanisms.

Figure 2:
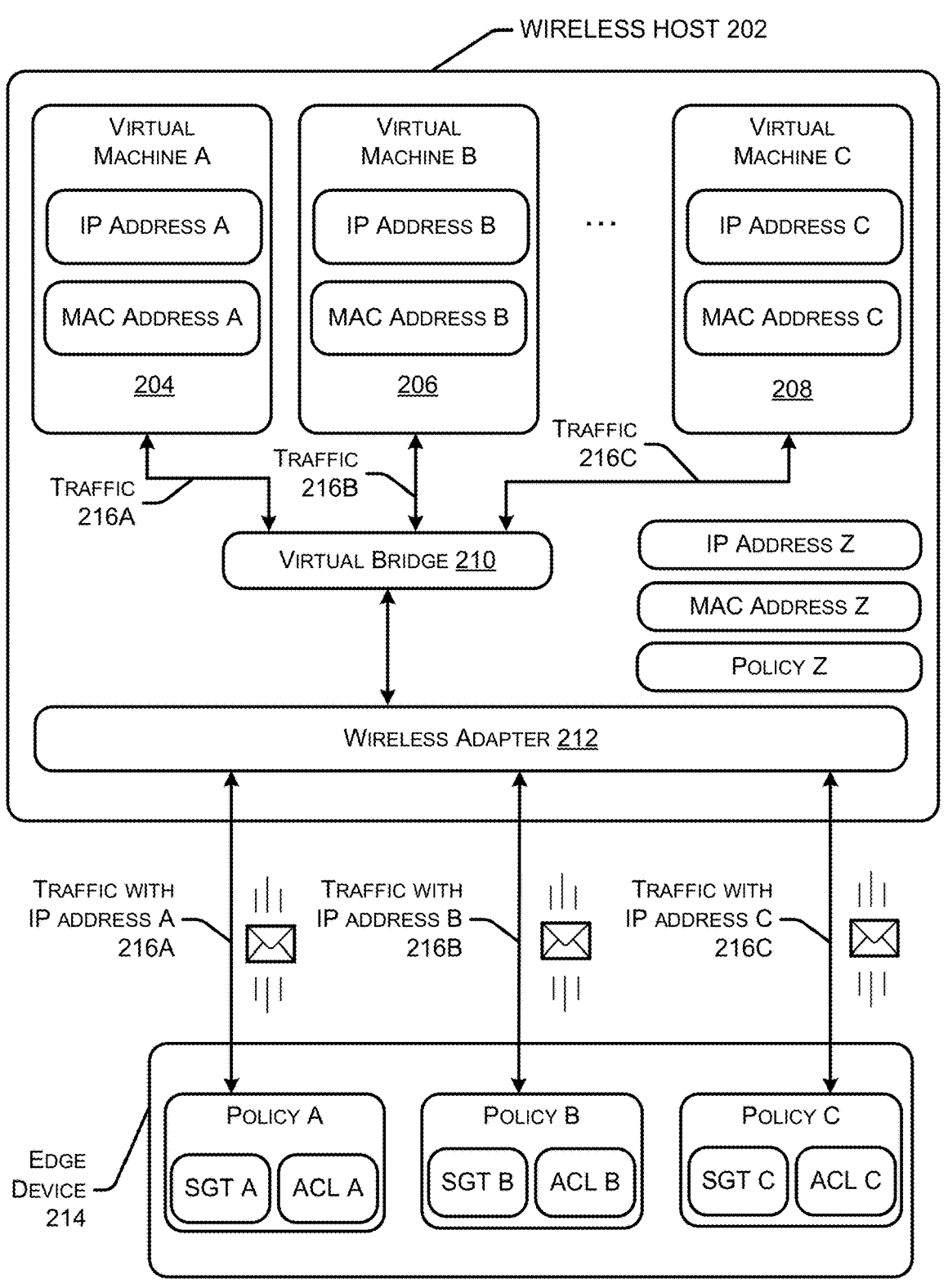
FIG. 2 illustrates a host and multiple virtual machines with various IP addresses, MAC addresses, and security policies.

FIG. 2 illustrates a system-architecture diagram of an example network 200 containing a wireless host with a wireless network adapter, multiple VMs, and an edge device in a data communication network. A wireless host device 202 and multiple virtual machines with various IP addresses, MAC addresses, and security policies are shown. FIG. 2 is similar to FIG. 1, but includes additional details regarding IP addresses, MAC addresses, and security policies associated with the host and the multiple VMs. As illustrated in FIG. 2, wireless host device 202 includes multiple VMs, VM A 204, VM B 206, and VM C 208. Wireless host device 202 also includes a virtual bridge 210. In some embodiments, wireless host device 202 is coupled to a wireless adapter 212.

VM 204 has a specific IP address, a specific MAC address, and a specific security policy (all labeled "A" for this example). Similarly, VMs 206 and 208 also have specific IP addresses, specific MAC addresses, and specific security policies (labeled "B" and "C," respectively, for this example). As further shown in FIG. 2, wireless host device 202 also has a specific IP address, a specific MAC address, and a specific security policy (all labeled "Z" for this example). Thus, the IP address and MAC address for each VM 204, 206, and 208 are unique. Additionally, the IP addresses and MAC addresses for VMs 204, 206, and 208 are different from the IP address and MAC address of wireless host device 202. However, traffic communicated from the wireless host device 202 to the network infrastructure (e.g., access point) all have the same MAC address (e.g., MAC address of the wireless adapter 212) despite different VMs communicating the data.

As shown in FIG. 2, VMs 204, 206, and 208 are operating in bridge mode, therefore their MAC addresses are overwritten by the wireless host device 202 MAC address, the MAC address of the wireless adapter 212. Therefore, other devices coupled to wireless host device 202 (e.g., in the same network) cannot identify the VMs being executed by wireless host device 202. In the case of an example zero trust deployment, this causes problems for devices and systems that rely on visibility or control over all clients in the network, including VMs operating on a wireless host device. A requirement for VM visibility means that the IP addresses and MAC addresses of VMs 204, 206, and 208 are to be available to other devices and systems in the network. In addition to IP addresses and MAC addresses, some devices and systems access the policies associated with each VM 204, 206, and 208. The systems and methods discussed herein discover, for example, the IP address, MAC address, and differentiated policies associated with the VMs.

As shown in FIG. 2, one or more edge devices 214 (e.g., router, firewall, switch, etc.) may enforce security policies for the different VMs and/or the wireless host device 202 itself. The traffic 216A, 216B, and 216C communicated to and from VM A, VM B, and VM C may be subjected to respective security policies at an edge device 214 based on the respective IP addresses for the VMs. Based on source IP lookup, if the IP address is the source IP address of the VM, then an SGT tag which is assigned to the VM is applied. In addition, if there is a redirection or posturing policy to be applied to a VM, the source IP lookup also provides information on which ACL is to be applied. If a redirection ACL is assigned to the VM, the VM goes through a redirection process (e.g., a web authentication such as WebAuthn API) and is then authenticated via the web authentication server. Once authenticated, the web authentication server provides information to an identity service platform (e.g., Identity Service Engine (ISE)) which sends a change of authorization to the authenticator (e.g., edge device) which removes the redirection ACL and updates the final SGT to be used. Finally, a default policy may be applied which allows the traffic from the VM to be dropped or quarantined until the VM is authenticated.

Figure 3:
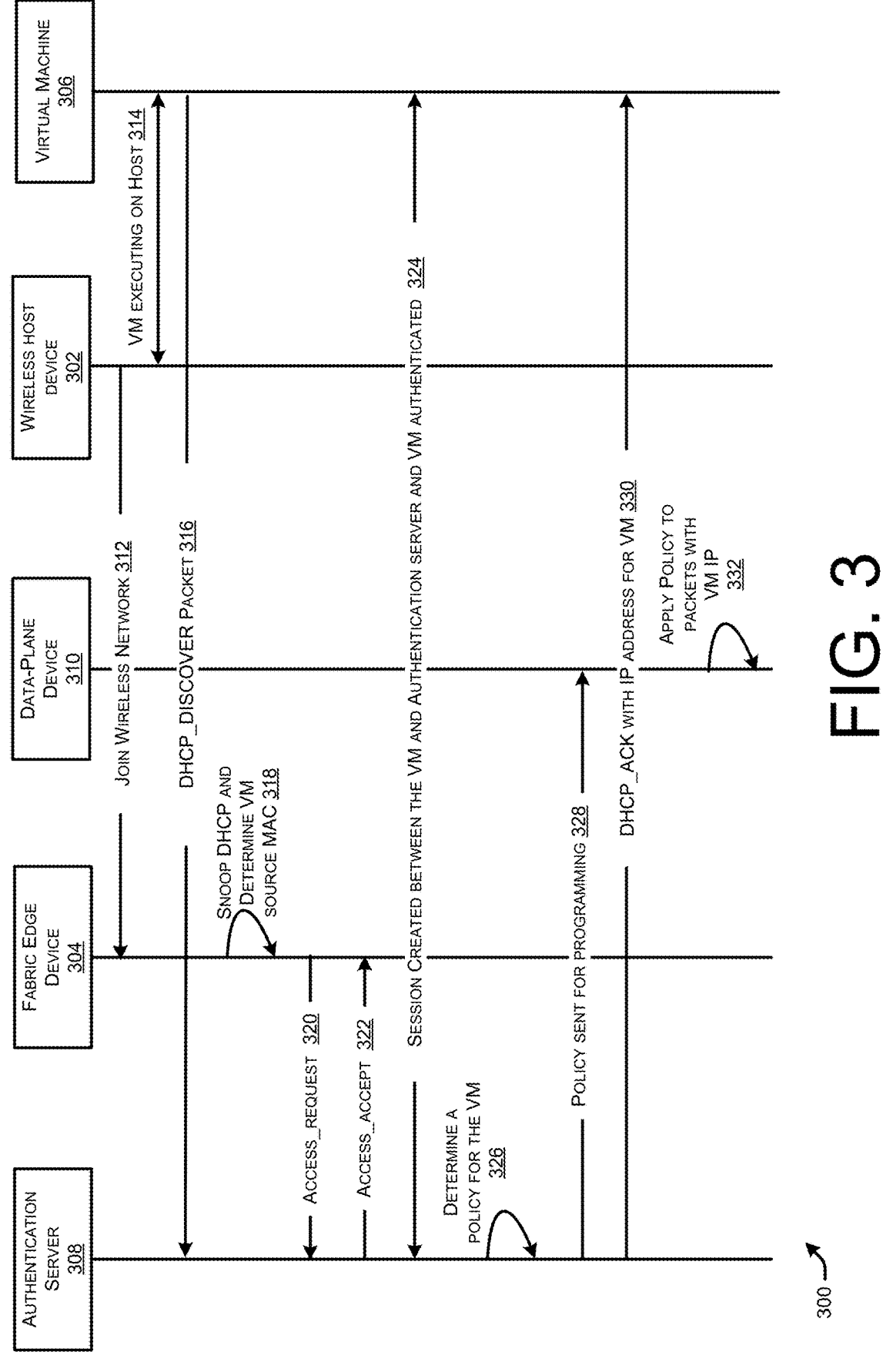
FIG. 3 illustrates an example authentication and policy enforcement process for use with bridged virtual machines executing on a wireless host device.

FIG. 3 illustrates an example authentication and differentiated policy enforcement process 300 for use with bridge VMs executing on a wireless host device.

Initially, a wireless host client device 302 may perform operations for joining a wireless network at 312. The client device 302 may be any type of device (e.g., wireless host device 102) capable of running one or more VMs in bridge mode, and connecting to a wireless network. For instance, the client device 302 may perform any protocol with, or send any type of request to, a fabric edge device 304 associated with a network fabric to join a wireless network.

A VM 306 is provisioned to execute on the wireless host device 302 at 314. One or more VMs may be executing on the wireless host device and using the wireless host's network interface to communicate with external devices over a MAC-based authentication network.

At 316, the VM 306 sends a DHCP_DISCOVER packet to an authentication server 308. In a network where the VM 306 is assigned a source IP address using dynamic host configuration protocol, the client VM initiates the DHCP process by broadcasting a DHCP_DISCOVER packet on the network to request an IP address from the authentication server 308 when the VM 306 joins the network.

At 318, the fabric edge device 304 performs a deep packet inspection on the DHCP_DISCOVER packet sent by the VM in order to determine the source MAC address of the VM. The client hardware address (CHADDR) field of the DHCP_DISCOVER packet contains the source MAC of the VM.

At 320, an Access_Request message is sent from the fabric edge device to the authentication server requesting a session for the VM. In a wireless network that uses RADIUS networking protocol to provide authentication and authorization for clients requesting access to the network, a request message, an Access_Request, is sent to an authentication server to gain access to the network and a particular network resource using access credentials.

At 322 the authentication server returns an Access_Accept message, and at 324 a session is created between the VM and the authentication server, and the VM is authenticated. In the wireless network using RADIUS to provide authentication and authorization for clients, the authorization server reads the credentials sent in the Access_Request that was received, and if the credentials are from an authorized client, the authentication server returns an Access_Accept message, indicating the client is authorized to join the network and gain access to particular network resources.

At 326, a policy for the VM is determined. For example, an SGT and ACL assigned to the VM may be determined. However, the policy cannot be applied yet, as it is a policy for the source MAC address of the VM which is not seen in the data-plane. At 328, the policy is sent to a data-plane device 310 for programming.

At 330, the VM receives a DHCP_ACK message from the authentication server that includes a source IP address for the VM to create a MAC-IP binding for the VM. In a network where a client, in this case, the VM 306, uses DHCP to obtain an IP address when the client joins the network, the client initially send a DHCP_DISCOVER packet requesting an IP address from the authentication server 308 (as in step 316 above), the authentication server 308 will respond with an offer (DHCP_OFFER) which is an offer of an IP address that the client may lease. When the client receives the DHCP_OFFER, the client responds with a request (DHCP_REQUEST) requesting the offered IP address. When the authentication server 308 receives the DHCP_RE-QUEST, the authentication server 308 responds with an acknowledgement (DHCP_ACK) which includes a lease duration for the source IP address the client and server have agreed upon. Finally, at 332, the policy for the VM is applied to packets with an IP address of the VM, based on the MAC-IP binding created in the previous step.

FIGS. 4, 5A and 5B illustrate flow diagrams of example methods 400 and 500 that illustrate various aspects of the techniques of this disclosure. The logical operations described herein with respect to FIGS. 4, 5A, and 5B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4, 5A, and 5B and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 4 illustrates a flow diagram of an example method 400 for authenticating and enforcing policies in the network shown in FIG. 1 and FIG. 2. The operations described herein with respect to the method 400 may be performed by various components and systems, such as the components illustrated and discussed herein. The operations of method 400 may authenticate and enforce various policies on the individual VMs executing in bridge mode on a wireless host device.

At operation 402, a wireless host device is authorized to join a fabric enabled wireless network. For instance, the wireless host device is authenticated and authorized to join a MAC-based authentication network by a wireless controller (WLC).

At operation 404, a VM executes in bridge mode on the wireless host device. For example, one or more VMs may be executing on the wireless host device and using the wireless host's network interface to communicate with external devices over a network. A virtual network adapter in the VM connects to a physical network adapter in the host device, for example an Ethernet adapter, which enables the VM to connect to a LAN that the host system uses.

At operation 406, a fabric edge device determines a source MAC address of the VM. In some implementations the source MAC for the VM is discovered by the fabric edge device performing a deep packet inspection by snooping a DHCP_DISCOVER packet sent by the VM to an authentication server. The client hardware address (CHADDR) field of the DHCP_DISCOVER packet contains the source MAC of the VM, which will be different from the source MAC in the ethernet header that contains the wireless host device's MAC address.

At operation 408, a session is created, by the fabric edge device, between the VM and an authentication server. In some cases, the fabric edge device sends an Access_Request message to the authentication server. The authentication server will send an Access_Accept message back to the fabric edge device, indicating acceptance of the VM and creation of the session. However, until the VM is accepted, and a session created, all DHCP_DISCOVER packets sent from the VM will be dropped.

At operation 410, the authentication server authenticates the VM. Once the source MAC address of the VM has been determined, MAB can be initiated and the VM can be authenticated as any other client in a MAC-based authentication network.

At operation 412, a policy for the VM is determined, at least partly by the authentication server. For example, an SGT tag and ACL are assigned to the VM. At this point, the policy cannot be applied yet, as it is a policy for the source MAC of the VM which is not seen in the data-plane. Thus, the policy is sent to the data-plane for programming but will wait for the IP address to get assigned.

At operation 414, an IP address is assigned to the VM to create a MAC-IP binding for the VM. Once the VM is authenticated, the DHCP process can continue (e.g., DHCP_DISCOVER→DHCP_OFFER→DHCP_RE-QUEST→DHCP_ACK). When a DHCP_ACK is sent to the VM from the authentication server, the MAC-IP binding for the VM is established.

At operation 416, a data-plane device in the fabric enabled wireless network is programmed to apply the policy to data-plane traffic communicated with the VM. For instance, based on source IP lookup, if the IP address is the source IP address of the VM, then an SGT tag which was assigned to the VM is applied. In addition, if there is an ACL assigned to the VM, then the ACL is applied if the IP address is the source IP address of the VM. Traditionally, for clients connected to a MAC-based authentication network, a client is classified via a source MAC lookup, which retrieves a policy to be applied to the client. However, the source MAC address for the VM executing in bridge mode on a wireless host device is not seen by the fabric edge, therefore based on the MAC-IP binding for the VM, the policy can be applied to traffic originating from the VM based on the source IP address of the VM and not the source MAC address of the VM.

At operation 418, the policy for the VM is applied by the data-plane device. Based on the MAC-IP binding, the policy is applied to packets having the source IP address of the VM.

FIGS. 5A and 5B illustrate a flow diagram of an example method for authenticating and enforcing policies for a VM executing on a wireless host device in a MAC-based authentication network where the VM is assigned a source IP address using DHCP. The operations described herein with respect to the method 500 may be performed by various components and systems, such as the components illustrated and discussed herein. The operations of method 500 may authenticate and enforce various policies on the individual VMs executing in bridge mode on a wireless host device.

At operation 502, a wireless host device is authorized to join a fabric enabled wireless network. For instance, the wireless host device is authenticated and authorized to join a MAC-based authentication network by a wireless controller (WLC).

At operation 504, a VM executes in bridge mode on the wireless host device. For example, one or more VMs may be executing on the wireless host device and using the wireless host's network interface to communicate with external devices over the network. A virtual network adapter in the VM connects to a physical network adapter in the host device, for example an Ethernet adapter, which enables the VM to connect to a LAN that the host system uses.

At operation 506, the VM sends a DHCP_DISCOVER packet. For example, in an implementation where the VM is assigned a source IP address using DHCP, the VM begins the process by sending a DHCP_DISCOVER packet to an authentication server.

At operation 508, a fabric edge device performs deep packet inspection by snooping the DHCP_DISCOVER packet sent by the VM to the authentication server in order to determine the source MAC address of the VM.

At operation 510, the fabric edge device identifies a source MAC address of the VM by performing a deep packet inspection by snooping a DHCP_DISCOVER packet sent by the VM. The CHADDR field of the DHCP_DISCOVER packet contains the source MAC of the VM, which will be different from the source MAC in the ethernet header that contains the wireless host device's source MAC address.

At operation 512, the fabric edge device sends an Access_Request message to the authentication server to create a session for the VM.

At operation 514, the fabric edge device will drop all DHCP_DISCOVER packets sent by the VM until the VM is authenticated.

At operation 516, the fabric edge device receives an Access_Accept message from the authentication server indicating acceptance of the VM and the creation of a session for the VM.

At operation 518, the VM is authenticated by the authentication server. Once the source MAC for the VM is discovered, a MAB authentication session for the VM can be initiated, and the VM can be authenticated as any other client in a MAC-based authentication network. In addition, the client information for the VM may be augmented to indicate that the session is a "child session" and adds a "parent session ID" which is the wireless host device's source MAC address. This allows the authentication server to establish a "child" (VM) and "parent" (host) relationship.

At operation 520, a policy for the VM is determined and an SGT and ACL assigned to the VM based at least in part on the policy. The policy cannot be applied yet, as it is a policy for the source MAC address of the VM which is not seen in the data-plane.

At operation 522, the VM receives a DHCP_ACK message from the authentication server, comprising a source IP address for the VM to create a MAC-IP binding for the VM. As an example, once the VM is authenticated, the DHCP process can continue (e.g., DHCP_DISCOVER→DHCP_OFFER→DHCP_REQUEST→DHCP_ACK). When a DHCP_ACK is sent to the VM from the authentication server, the MAC-IP binding for the VM is established.

At operation 524, a data-plane device in the fabric enabled wireless network is programmed to apply the policy for the VM to data-plane traffic communicated with the VM.

At operation 526, the SGT and ACL are applied to data-plane traffic communicated with the VM by the data-plane device. For example, based on source IP lookup, if the IP address is the source IP address of the VM, an SGT tag which was assigned to the VM is applied. And if an ACL is assigned to the VM, the ACL is also applied if the IP address is the source IP address of the VM.

Figure 6:
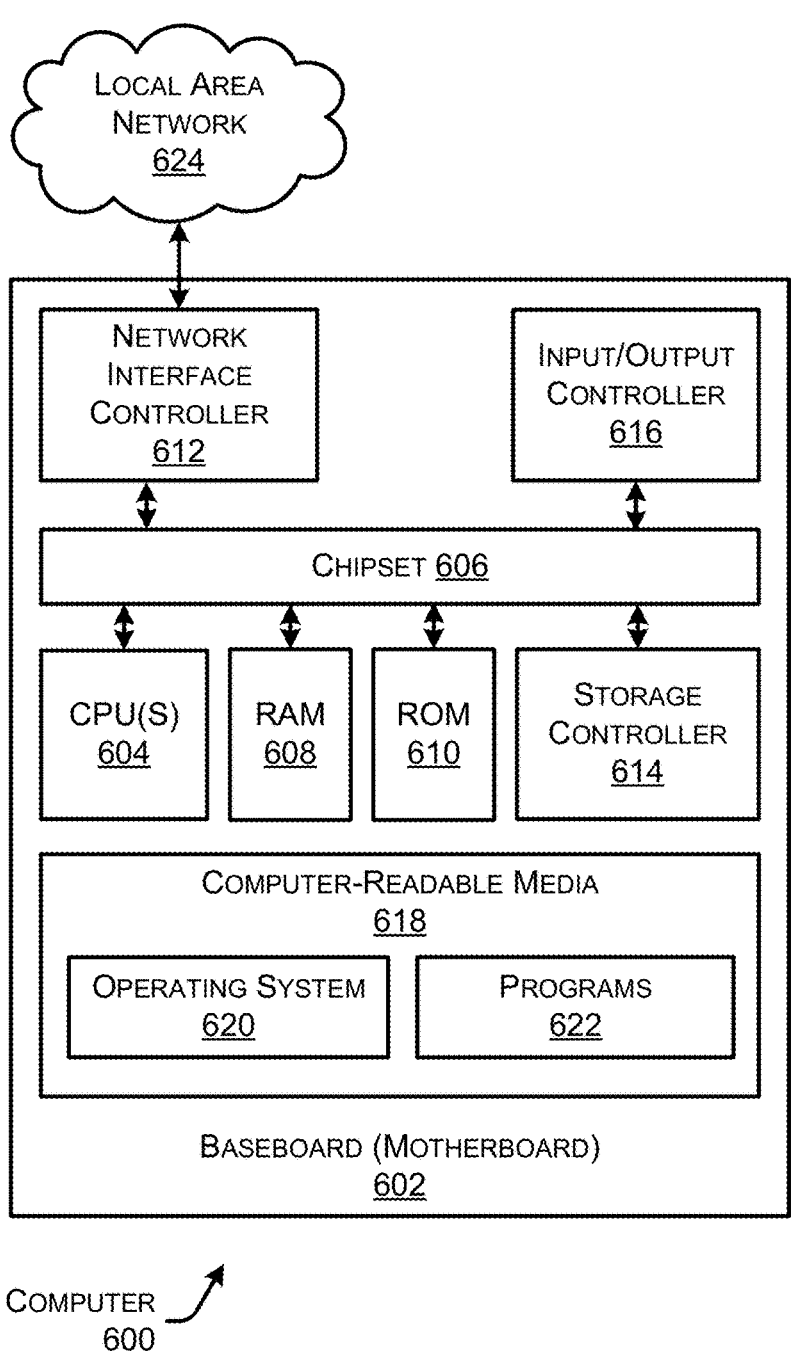
FIG. 6 is a computer architecture diagram showing an illustrative computer hardware architecture for implementing a computing device that can be utilized to implement aspects of the various technologies presented herein.

FIG. 6 shows an example computer architecture for a computer 600 capable of executing program components for implementing the functionality described herein. The computer architecture shown in FIG. 6 illustrates a conventional server computer, workstation, desktop computer, laptop, tablet, network appliance, e-reader, smartphone, or other computing device, and can be utilized to execute any of the software components presented herein. The computer 600 may, in some examples, correspond to any of the servers, routers, or devices discussed herein. In some embodiments, computer 600 may include networked devices such as servers, switches, routers, hubs, bridges, gateways, modems, repeaters, access points, etc. Additionally, in some implementations, the programs or software discussed herein may be configured to perform operations performed by any of the devices. In some instances, the computer may correspond to any device described herein and be configured to perform operations performed by any device, and/or may be a system of devices that perform the techniques described herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 624. The chipset 606 can include functionality for providing network connectivity through a Network Interface Controller (NIC) 612, such as a gigabit Ethernet adapter. The NIC 612 is capable of connecting the computer 600 to other computing devices over the network 624. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by devices described herein, and or any components included therein, may be supported by one or more devices similar to computer 600. Stated otherwise, some or all of the operations performed by the wireless host device 102, and or any components included therein, may be performed by one or more computer devices 600 operating in a system.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described herein. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a router, a border router, and/or a server. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to perform operations comprising:
determining, by a fabric edge device, a media access control (MAC) address of a virtual machine (VM) executing on a host device;
transmitting, by the fabric edge device and to an authentication server, an access request to create a session for the VM;
receiving, by the fabric edge device and from the authentication server, an indication that the V M is authenticated and a session for the VM has been created, wherein the authentication server determines a policy to apply to packets communicated from the VM and assigns an Internet Protocol (IP) address to the VM to create a MAC-IP binding for the VM; and
applying, by the fabric edge device, the policy for the VM to packets with a source IP address corresponding to the IP address assigned to the VM.

2. The system of claim 1, wherein the VM is assigned the source IP address using dynamic host configuration protocol (DHCP) and the operations further comprise performing, by the fabric edge device, deep packet inspection by snooping a DHCP_DISCOVER packet sent by the VM to identify a source MAC address of the VM.

3. The system of claim 1, wherein applying the policy for the VM is based at least in part on a security group tag (SGT) and an access control list (ACL) assigned to the VM.

4. The system of claim 3, the operations further comprising:
applying the SGT assigned to the VM based at least in part on determining that a source IP address is the source IP address of the VM; and
applying the ACL assigned to the VM based at least in part on determining that the source IP address is the source IP address of the VM.

5. The system of claim 4 wherein applying the ACL further comprises:
applying to the VM a redirection ACL;
authenticating the VM via a web authentication server;
sending a change authorization to the fabric edge device for removal of the redirection ACL; and
updating a final SGT for the VM.

6. The system of claim 1, wherein the authentication server establishes the VM as a child session associated with a parent session identifier (parent session ID), wherein the parent session ID is a MAC address of the host device.

7. The system of claim 1, wherein a default policy allows network traffic originating from the VM to be dropped or quarantined until the VM is authenticated.

8. A method for applying a policy to a bridge mode virtual machine (VM) on a host device, the method comprising:
determining, by a fabric edge device, a media access control (MAC) address of the VM executing on the host device;
transmitting, by the fabric edge device and to an authentication server, an access request to create a session for the VM;
receiving, by the fabric edge device and from the authentication server, an indication that the VM is authenticated and a session for the VM has been created, wherein the authentication server determines a policy to apply to packets communicated from the VM and assigns an Internet Protocol (IP) address to the VM to create a MAC-IP binding for the VM; and
applying, by the fabric edge device, the policy for the VM to packets with a source IP address corresponding to the IP address assigned to the VM.

9. The method of claim 8, wherein the VM is assigned the source IP address using dynamic host configuration protocol (DHCP) and further comprise performing, by the fabric edge device, deep packet inspection by snooping a DHCP_DISCOVER packet sent by the VM to identify a source MAC address of the VM.

10. The method of claim 8, wherein applying the policy for the VM is based at least in part on a security group tag (SGT) and an access control list (ACL) assigned to the VM.

11. The method of claim 10, further comprising:
applying the SGT assigned to the VM based at least in part on determining that a source IP address is the source IP address of the VM; and
applying the ACL assigned to the VM based at least in part on determining that the source IP address is the source IP address of the VM.

12. The method of claim 11, wherein applying the ACL further comprises:
applying to the VM a redirection ACL;
authenticating the VM via a web authentication server;
sending a change authorization to the fabric edge device for removal of the redirection ACL; and
updating a final SGT for the VM.

13. The method of claim 8, wherein the authentication server establishes the VM as a child session associated with a parent session identifier (parent session ID), wherein the parent session ID is a MAC address of the host device.

14. The method of claim 8, wherein a default policy allows network traffic originating from the VM to be dropped or quarantined until the VM is authenticated.

15. One or more non-transitory computer-readable media storing instructions that, when executed, cause one or more processors to perform operations comprising:

determining, by a fabric edge device, a media access control (MAC) address of a virtual machine (VM) executing on a host device;

transmitting, by the fabric edge device and to an authentication server, an access request to create a session for the VM;

receiving, by the fabric edge device and from the authentication server, an indication that the VM is authenticated and a session for the VM has been created, wherein the authentication server determines a policy to apply to packets communicated from the VM and assigns an Internet Protocol (IP) address to the V M to create a MAC-IP binding for the VM; and applying, by the fabric edge device, the policy for the VM to packets with a source IP address corresponding to the IP address assigned to the VM.

16. The one or more non-transitory computer-readable media of claim 15, wherein the VM is assigned the source IP address using dynamic host configuration protocol (DHCP) and the operations further comprise performing, by the fabric edge device, deep packet inspection by snooping a DHCP_DISCOVER packet sent by the VM to identify a source MAC address of the VM.

17. The one or more non-transitory computer-readable media of claim 15, wherein applying the policy for the VM is based at least in part on a security group tag (SGT) and an access control list (ACL) assigned to the VM.

18. The one or more non-transitory computer-readable media of claim 17, further comprising:

applying the SGT assigned to the VM based at least in part on determining that a source IP address is the source IP address of the VM; and applying the ACL assigned to the VM based at least in part on determining that the source IP address is the source IP address of the VM.

19. The one or more non-transitory computer-readable media of claim 18, wherein applying the ACL further comprises:

applying to the VM a redirection ACL;

authenticating the VM via a web authentication server;

sending a change authorization to the fabric edge device for removal of the redirection ACL; and updating a final SGT for the VM.

20. The one or more non-transitory computer-readable media of claim 15, wherein the authentication server establishes the VM as a child session associated with a parent session identifier (parent session ID), wherein the parent session ID is a MAC address of the host device.

\* \* \* \* \*